United States Patent Office 3,222,338
Patented Dec. 7, 1965

3,222,338
METHOD OF PRODUCING POLYVINYL FORMATE OF HIGH CRYSTALLINITY
Kiyoshi Fujii, Saburo Imoto, Junji Ukida, and Masakazu Matsumoto, all of Kurashiki, Japan, assignors to Kurashiki Rayon Co., Ltd., Okayama Prefecture, Japan, a corporation of Japan
No Drawing. Filed Aug. 23, 1961, Ser. No. 133,288
Claims priority, application Japan, Sept. 9, 1960, 35/37,475
5 Claims. (Cl. 260—89.1)

This invention relates to a process of producing polyvinyl formate having a very high degree of crystallinity and is more particularly concerned with a process of producing highly crystallized polyvinyl formate having a novel crystalline structure.

Vinyl trifluoroacetate was the only previously known example of a vinyl ester monomer which produces a crystalline polymer until we discovered that a crystalline polymer possessing a syndiotactic structure could be obtained by polymerizing vinyl formate under specified conditions as described in our co-pending application Serial No. 43,178, filed July 15, 1960.

Recently, a highly crystallized polyvinyl chloride was reported to have been obtained by polymerizing vinyl chloride in acetaldehyde at high temperatures (Chem. and Eng. News, April 18, 1960). Since vinyl esters, e.g. vinyl acetate, usually contain acetaldehyde as an impurity, many studies have been made on the effect of a small amount of an aldehyde during the polymerization of such monomers. However, no case in which the properties of the polymers are improved by polymerization in the presence of an aldehyde has ever been found nor have crystalline products been produced.

It is an object of this invention to provide a process of producing highly crystalline polymers of vinyl formate.

In accordance with the present invention, vinyl formate is polymerized in the presence of a large quantity of an aliphatic aldehyde, e.g. a normally liquid aliphatic aldehyde, such as acetaldehyde and butyraldehyde. The aldehyde is used in the amount of at least 50 mol percent based on the weight of the monomer. We have made the discovery that when vinyl formate is polymerized in the presence of a quantity of an aldehyde above the specified predetermined minimum amount, a polymer in finely divided powder form precipitates in the system as the polymerization proceeds. The polymer thus obtained is a white powder and possesses a very high crystallinity, in contrast to the usual polyvinyl formate which is a non-crystalline polymer or at most has very poor crystallinity. A single aldehyde, or a mixture of aldehydes may be used, the upper limit of the aldehyde can vary widely and is governed primarily by economic considerations. Since the aldehyde appears to function as a solvent, the quantity of the aldehyde, and any other solvent which may be present, is normally selected to provide a monomer concentration such as that normally found in conventional vinyl ester polymerization procedures, e.g. a monomer concentration of 10 to 75%. Solvents for vinyl formate which are compatible with the aldehydes and non-reactive with them are suitably used. Particularly advantageous are normally liquid saturated esters such as lower alkyl aliphatic esters, particularly lower alkyl formates, e.g. methyl formate, as disclosed in our above-mentioned co-pending application, Serial No. 43,-178, now United States Patent No. 3,134,758.

It has been found in the case of many polymers, such as polyvinyl chloride, polychlorotrifluoroethylene, polyethylene, and the like, that when the degree of polymerization of the polymer is below a certain value, the relationship between molecular weight and crystallinity can not be ignored, and it is thought that the crystallinity becomes higher for polymers of lower molecular weight. In the case of vinyl formate, however, produced in accordance with this invention, the highly crystalline polymer obtained by polymerization in the presence of an aldehyde is characterized by the fact that it has a crystal form which is entirely different from that of the crystallized polymer producible by the process described in the above-mentioned application. In spite of this, it is clear from tests such as elementary analysis and infrared absorption spectra that the polymer obtained in accordance with this invention is polyvinyl formate, and this polyvinyl formate has a high density and has a sharply-defined melting point, different from the corresponding properties of polyvinyl formate obtained heretofore. Because of these properties and the relatively low molecular weight of the polymer, its melting viscosity is low, and accordingly, it is possible to subject this polymer to molding processes at temperatures as low as 80–100° C. to produce molded products of various forms. It is also a characteristic feature of the polymer produced in accordance with this invention that it may be applied with ease for the filling of various open structures. The polyvinyl alcohol obtained by conventional saponification of the polyvinyl formate obtained by the polymerization in the presence of an aldehyde in accordance with our process was found to have an extremely high crystallinity compared with the usual polyvinyl alcohol on the basis of X-ray diffraction, specific gravity, and infra-red spectra.

The invention will be further understood from the following specific examples of practical application. However, it will be understood that these examples are not to be construed as limiting the scope of the present invention in any manner. In the examples, all parts are by weight unless otherwise indicated.

*Example 1*

There was added 0.00046 part of azobisisobutyronitrile to 1 part of vinyl formate, 0.86 part of methyl formate, and 58 mole percent, based on the monomer, of acetaldehyde, and the monomer was polymerized at 60° C. for 72 hours in a nitrogen atmosphere. The polymer yield was 65.4%, and the degree of polymerization was determined to be 68 from solution viscosity measurements. This product was a highly crystalline polymer, having a density 1.352 and melting sharply at 85° C.

*Example 2*

Acetaldehyde in the amount of 50 mol percent based on the monomer and 80 mol percent based on the monomer of butyraldehyde were added to 1 part of vinyl formate, and 0.86 part of methyl formate; 0.00046 part of 2,2'-azobisisobutyronitrile was added as the polymerization catalyst. Polymerization was effected at 60° C. for 96 hours. The yield of polymer was 15.4%, and the degree of polymerization of the polyvinyl formate obtained was 41. This polymer was highly crystallized, but the reflection at the 2θ angle of 13°30', observable with ordinary crystallized polyvinyl formate was absent. The X-ray diagram of the polymer powder exhibited sharp reflections at the following 2θ angles: 10°50', 13°, 16°18', 19°30', 21°54', 23°42', 26°18', and 30°6'.

The conditions and relative relationships set forth in the examples are those preferred but it will be understood that other conditions and relationships may be used within the scope of the invention. In general, unless otherwise indicated, conventional operations and techniques are suitably employed. For example, the polymerization catalyst employed may be any of the conventional catalysts used in the polymerization of vinyl formate, such as azonitriles or peroxides, but the use of azonitriles is preferred. Thus, conventional vinyl formate polymerization techniques, catalysts, temperatures and polymerization apparatus are employed and suitable polymerization catalysts, vessels and techniques are described, for example, in Hatchard et al. U.S. Patent 2,610,359. Conventional techniques and operations are also employed in the conversion of the polyvinyl formate into polyvinyl alcohol.

With respect to known saponification processes and techniques for producing polyvinyl alcohol from polyvinyl formate, reference is suitably made, for example, to Bristol U.S. Patent 2,700,035, Waugh et al. U.S. Patent 2,642,419 and Germain U.S. Patent 2,643,994.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A method of preparing highly crystalline polyvinyl formate which comprises,
   preparing a polymerization system containing vinyl formate monomer and a free radical polymerization catalyst and a normally-liquid aliphatic aldehyde solvent,
   said aldehyde solvent being present in said polymerization system in an amount of at least 50 mol percent based on the weight of said vinyl formate monomer,
   said normally-liquid aliphatic aldehyde solvent being selected from the group consisting of acetaldehyde, butyraldehyde, and a mixture of acetaldehyde and butyraldehyde;
   polymerizing said vinyl formate monomer in said polymerization system;
   and recovering highly crystalline polyvinyl formate from said system.

2. A method according to claim 1, wherein said aldehyde solvent is acetaldehyde.

3. A method according to claim 1, wherein said aldehyde solvent is butyraldehyde.

4. A method according to claim 1, wherein said aldehyde solvent is a mixture of acetaldehyde and butyraldehyde.

5. A method of preparing highly crystalline polyvinyl alcohol which comprises,
   polymerizing vinyl formate monomer in a polymerization system to produce highly crystalline polyvinyl formate;
   said polymerization system containing vinyl formate monomer, a free radical polymerization catalyst and a normally-liquid aliphatic aldehyde solvent,
   said aldehyde solvent being present in said polymerization system in an amount of at least 50 mol percent based on the weight of said vinyl formate monomer,
   said normally-liquid aliphatic aldehyde solvent being selected from the group consisting of acetaldehyde, butyraldehyde, and a mixture of acetaldehyde and butyraldehyde;
   and saponifying said produced highly crystalline polyvinyl formate to prepare said highly crystalline polyvinyl alcohol.

References Cited by the Examiner

UNITED STATES PATENTS

| | | | |
|---|---|---|---|
| 1,746,665 | 2/1930 | Matheson et al. | 260—89.1 |
| 2,122,805 | 7/1938 | Wulff et al. | 260—73 |
| 2,326,048 | 8/1943 | McNally | 260—73 |
| 2,569,932 | 10/1951 | Izard | 260—73 |
| 2,642,419 | 10/1954 | Waugh et al. | 260—91.3 |
| 2,919,261 | 12/1959 | Christenson | 260—73 |

FOREIGN PATENTS

| | | |
|---|---|---|
| 645,405 | 11/1950 | Great Britain. |
| 819,254 | 8/1959 | Great Britain. |
| 535,612 | 1/1957 | Canada. |

OTHER REFERENCES

Skirrow: British Plastics and Moulded Plastics Trader (pages 507–510), February 1939.

Chemical & Engineering News, page 68, April 18, 1960.

JOSEPH L. SCHOFER, *Primary Examiner.*

H. N. BURSTEIN, JOSEPH R. LIBERMAN, WILLIAM H. SHORT, *Examiners.*